United States Patent
Buschmann et al.

(10) Patent No.: US 6,419,329 B1
(45) Date of Patent: Jul. 16, 2002

(54) METHOD FOR IMPROVING THE CONTROL PERFORMANCE OF A MOTOR VEHICLE CONTROL SYSTEM

(75) Inventors: Gunther Buschmann, Idstein; Jürgen Woywod, Mörfelden; Ralph Gronau, Wetter, all of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/529,447

(22) PCT Filed: Oct. 16, 1998

(86) PCT No.: PCT/EP98/06562

§ 371 (c)(1),
(2), (4) Date: Jun. 30, 2000

(87) PCT Pub. No.: WO99/20509

PCT Pub. Date: Apr. 29, 1999

(30) Foreign Application Priority Data

Oct. 17, 1997 (DE) .......................... 197 45 957
Oct. 29, 1997 (DE) .......................... 197 47 722
Apr. 11, 1998 (DE) .......................... 198 16 290

(51) Int. Cl.[7] .................................. B60T 8/34
(52) U.S. Cl. .......................... 303/113.1; 303/113.2; 303/116.2
(58) Field of Search .................... 303/113.1–113.5, 303/116.1, 116.2, 139

(56) References Cited

U.S. PATENT DOCUMENTS

| | | | |
|---|---|---|---|
| 4,865,399 A | * 9/1989 | Atkins et al. | 303/116.1 |
| 4,976,501 A | * 12/1990 | Sivulka et al. | 303/113.1 |
| 5,586,814 A | * 12/1996 | Steiner | 303/116.2 |
| 5,636,907 A | * 6/1997 | Okazaki et al. | 303/10 |
| 5,727,852 A | * 3/1998 | Pueschel et al. | 303/113.4 |
| 5,918,948 A | * 7/1999 | Burgdorf et al. | 303/113.2 |
| 6,142,583 A | * 11/2000 | Steffes | 303/114.1 |
| 6,209,968 B1 | * 4/2001 | Bayens et al. | 303/114.3 |
| 6,220,675 B1 | * 4/2001 | Steffes | 303/116.2 |
| 6,241,323 B1 | * 6/2001 | Wagner et al. | 303/113.4 |

FOREIGN PATENT DOCUMENTS

| | | |
|---|---|---|
| DE | 39 35 395 | 6/1990 |
| DE | 43 29 140 | 12/1994 |
| DE | 44 34 960 | 4/1996 |
| DE | 195 01 760 | 7/1996 |
| DE | 195 25 800 | 1/1997 |
| DE | 195 41 381 | 5/1997 |
| DE | 196 13 903 | 10/1997 |
| DE | 196 18 402 | 11/1997 |
| DE | 197 00 806 | 1/1998 |
| EP | 0 696 533 | 2/1996 |
| WO | 96 02409 | 2/1996 |
| WO | 97 13670 | 4/1997 |

* cited by examiner

Primary Examiner—Christopher P. Schwartz
(74) Attorney, Agent, or Firm—Rader, Fishman & Grauer PLLC

(57) ABSTRACT

To improve the control behavior of an automotive vehicle control system, such as an anti-lock system (ABS), a driving stability control system (ESP, ASMS, DDC), etc., in a brake system which includes a master cylinder, inlet and outlet valves for pressure modulation, a low-pressure accumulator, and a hydraulic pump for returning the pressure fluid discharged, when a wheel becomes unstable and upon commencement of the ABS control, that branch of the control system to which the unstable wheel is connected is temporarily uncoupled from the master cylinder pressure ($p_{HZ}$) or initial pressure by closing the pressure fluid conduit in the direction from the wheel brakes to-the master cylinder, and a relatively quick rise of the braking pressure and a quick approach of the wheel braking pressure to the master cylinder pressure ($p_{HZ}$) and, thus, the wheel lock pressure level is caused by returning pressure fluid from the low-pressure accumulator into this branch. A special valve which can provide a connection between the master cylinder and the suction side of the hydraulic pump is switched over to open-passage-only after the low-pressure accumulator has been emptied at least in part, or as required.

5 Claims, 2 Drawing Sheets

METHOD FOR IMPROVING THE CONTROL PERFORMANCE OF A MOTOR VEHICLE CONTROL SYSTEM

TECHNICAL FIELD

The present invention generally relates to a method for improving the control characteristics of automobiles and more particularly relates to using the vehicle's hydraulic brake system with a closed-loop control system for improving vehicle stability

BACKGROUND OF THE INVENTION

It can be observed in automotive vehicle control systems known in the art and used at present for anti-lock control (ABS) or driving stability control (ESP, ASMS, DDC) that with an initial pressure (pressure in the master cylinder) which is only slightly in excess of the wheel lock pressure level, a relatively poor (i.e. below the theoretically attainable value) brake performance is achieved because the control algorithms and control operations which aim at an optimum braking effect require an optimal, i.e. high initial pressure, as a precondition, or they are dimensioned for high initial pressures. To take into account and detect situations with low initial pressures which lie only slightly above the wheel lock pressure level, it is known in the art to implement defined learning algorithms which accordingly modify pressure modulation in response to relatively low initial pressures. However, a certain period of time lapses until these learning algorithms are optimally built up, with the result that precious braking effect is wasted and the stopping distance becomes longer than necessary.

In WO-A-97 13670 a method of operating a hydraulic brake system is described which assumes a brake system that includes brake slip control, traction slip control, and yaw torque control. The brake system shall be appropriate for active braking. The term "active braking" exclusively refers to a traction slip control operation or a yaw torque control operation by brake intervention, and brake intervention occurs without the driver's intent, i.e. without application of the brake pedal.

WO-A-96 02409 discloses a method of operating a wheel-lock controlled automotive vehicle brake system for driving stability and/or traction slip control operations. The objective of this method is to ensure prefilling of the wheel brakes with pressure fluid in order that the wheel brakes can be acted upon with braking pressure according to driving stability and/or traction slip control, although the driver himself/herself does not apply the brake pedal.

Finally, German patent application No. 39 35 595 describes a brake system for controlling a wheel brake of a vehicle wherein a separate magnetically-operated two-position/three-way valve in each circuit of the brake system is used to control pressurization of the respective brake circuit. The application further discloses a method-of preventing an imminent locked condition of the rear wheels.

Experience shows that the 'normal driver' applies the brake only hesitantly in many situations so that an initial pressure which is sufficient for an optimal controlled braking operation is not achieved at all, or at a too slow rate.

An object of the present invention is to eliminate the difficulties which occur especially at relatively low initial pressures, i.e. initial pressures which lie only slightly above the wheel lock pressure level, and to improve the control operation in such situations by enhanced utilization of the prevailing coefficient of friction or road surface conditions, thereby increasing the braking effect.

The method of the present invention achieves the objectives by implementing the following method. Upon commencement of the control, that branch of the braking pressure control system to which the wheel detected as unstable is connected is temporarily uncoupled from the master cylinder pressure or initial pressure by closing the pressure fluid conduit in the direction from the wheel brake to the master cylinder of the brake system, and that by returning pressure fluid from the accumulator (low-pressure accumulator) into the branch to which the unstable wheel is connected, a relatively quick rise of the braking pressure in the control branch or, respectively, a quick approach of the wheel braking pressure to the wheel lock pressure level is caused ('quick' meaning: compared to the braking pressure rise without uncoupling).

Even at a relatively low initial pressure, the method of the present invention permits achieving a pressure increase and an approach of the pressure in the mentioned branch and, thus, also in the wheel that became unstable to the wheel lock pressure level, which is relatively quick in comparison to conventional systems.

Upon commencement of the control, the separating valve is closed and the pressure fluid required for pressure build-up is initially taken from the accumulator (low-pressure accumulator), whereupon the special valve will be opened, i.e. switched to open passage, only after the accumulator has been emptied at least in part.

It has proved especially suitable to measure the degree of filling of the accumulator or the quantity of pressure fluid stored in the accumulator or to determine them in approximation by producing a so-called volume model, and to control the opening of the special valve in dependence on the degree of filling or the pressure fluid quantity. It is important that the fluid volume required for the pressure build-up in the wheel brakes is at disposal on the suction side of the hydraulic pump when it is needed. This fluid volume is either taken from the accumulator or supplied from the master cylinder by way of the special valve. Thus, for example, the special valve will only be opened or switched over to open passage as soon as the degree of filling or the volume in the accumulator has fallen below a predetermined minimum value.

In another embodiment of the present invention, the current pressure which is instantaneously prevailing in the master cylinder, is compared to the current deceleration of the vehicle or a pressure value which corresponds to. the deceleration, respectively. As is known, there is a defined relation between the pressure and the vehicle deceleration which can be achieved due to this braking pressure. When the comparison between pressure and deceleration shows that the vehicle deceleration exceeds a plausible value which corresponds to the current pressure in the master cylinder, this indicates that the vehicle brakes at a higher rate than the driver desires. The special control of the present invention 'oversteers', or there is an error. Therefore, switch-back to a standard braking pressure control is effected where the pressure upstream of the inlet valves to the wheel brakes is coupled to the initial pressure.

DETAILED DESCRIPTION OF THE PREFERRED EMBODIMENTS

Figure 1:
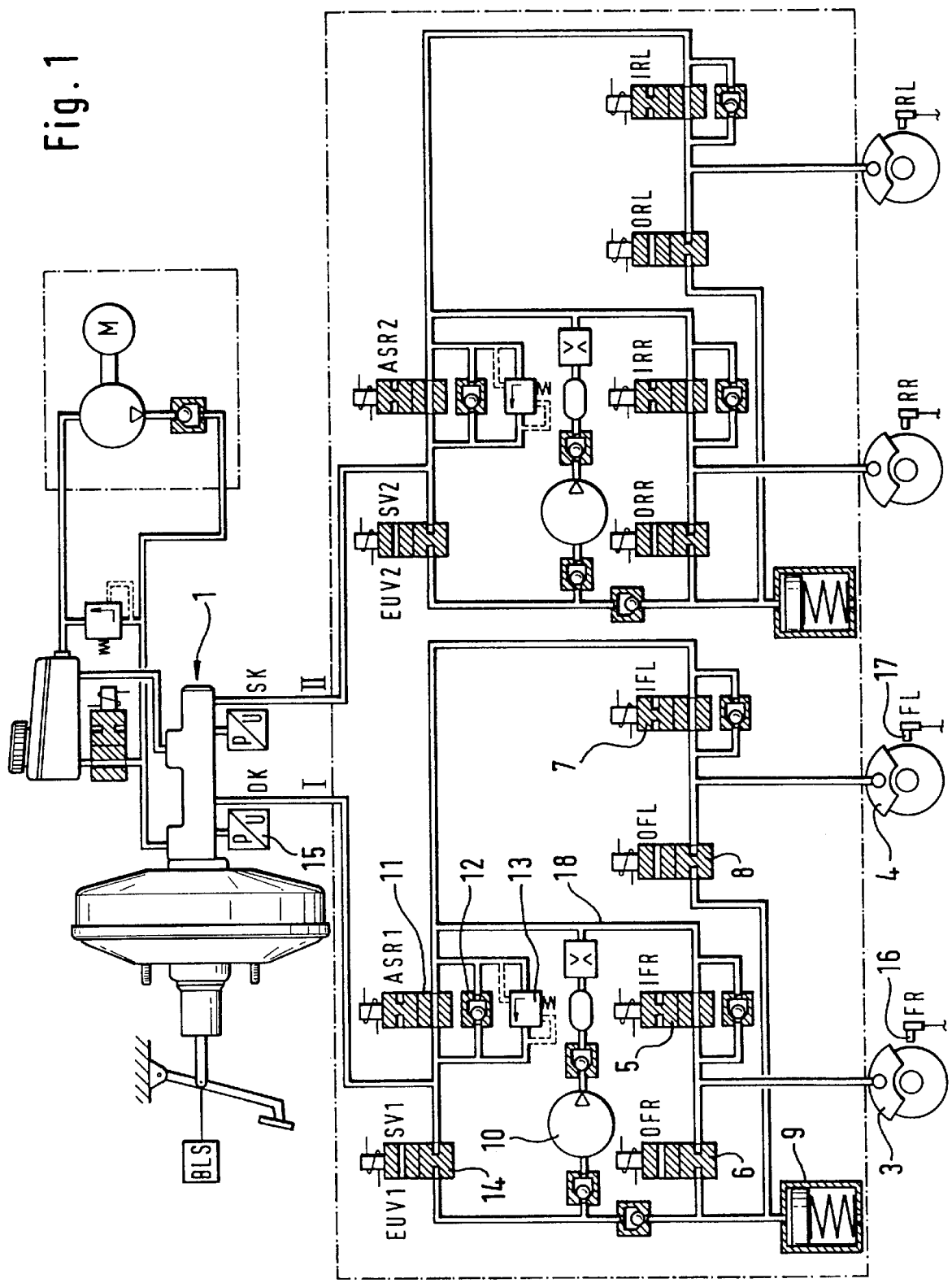
FIG. 1 is a view of the most important hydraulic components of a brake system in which the method of the present invention is implemented.

The embodiment of FIG. 1 shows a hydraulic brake system which is appropriate for anti-lock control (ABS) and traction slip control (TSC) as well as for driving stability control (ESP, ASMS, DDC). It will only be explained hereinbelow what is required to implement the method of the present invention.

The system shown in FIG. 1 is a dual-circuit hydraulic system with a closed-loop hydraulic system or braking pressure control system, respectively. The wheel brakes are connected to a master cylinder 1 (tandem master cylinder) by way of two brake circuits I, II of identical design. Therefore, it is sufficient to describe one of the two brake circuits, i.e. brake circuit I, in the following.

The components illustrated upstream of the master cylinder 1 are used for precharging. These components have no significance for the method of the present invention and, therefore, are not explained in detail.

Connected to the brake circuit I are wheel brakes 3 and 4 of the two front wheels FR, FL by way of one pair of inlet/outlet valves 5, 6; 7, 8, respectively. These valves are electromagnetically operable two-way/two-position directional control valves. The outlet valves 6, 8 lead to a low-pressure accumulator 9 which is evacuated by way of a hydraulic pump 10, the electric drive motor of which is not shown. A number of non-return valves are still inserted into the evacuation conduit for known reasons and in a conventional manner.

A separating valve 11 (or a so-called TSC-valve) is inserted in each brake circuit I (of course, also in II, which is not described though) in the pressure fluid conduit from the master cylinder 1 to the wheel brakes. Valve 11 is a two-way/two-position directional control valve which is open in its (denergised) inactive position and is bypassed by a non-return valve 12 in the direction of pressure fluid flow from the master cylinder 1 to the wheel brakes 3, 4 and the inlet valves 5, 7, respectively. Further, a pressure-limiting valve 13 is connected in parallel to the non-return valve 12. Separating valve 11 is required especially in a traction slip control (TSC) operation because braking pressure for intervention into the wheel brakes is required in such situations when the braking pressure generator is not actuated and master cylinder 1 is unpressurised.

Further, the brake system according to FIG. 1 includes a special valve 14, i.e., a two-way/two-position directional control valve which is closed in its inactive position and can be switched over electrically to open passage. In case of requirement, pressure fluid can be conducted by way of this special valve from the master cylinder 1 to the suction side of the hydraulic pump 10.

Finally, the brake system according to FIG. 1 is still equipped with pressure sensors 15 which permit measuring the actual initial pressure or, respectively, the hydraulic pressure built up in the two circuits I, II of the master cylinder 1.

Further comprised in a brake system of the type shown in FIG. 1 are wheel sensors 16, 17 by which the rotational behavior of the individual wheels can be determined and evaluated for braking pressure control.

The electronic unit for conditioning and evaluating the sensor signals and for generating the pump actuating signals and the valve actuating signals is not illustrated in FIG. 1 for the sake of clarity. Generally, electronic controllers with programmed circuits (microcomputers, microcontrollers, etc.) are nowadays used which permit computing the braking pressure control signals from the wheel sensor signals and, possibly, from other input quantities on the basis of complex algorithms, and producing the signals required to control the pump and actuate the valves.

Figure 2:
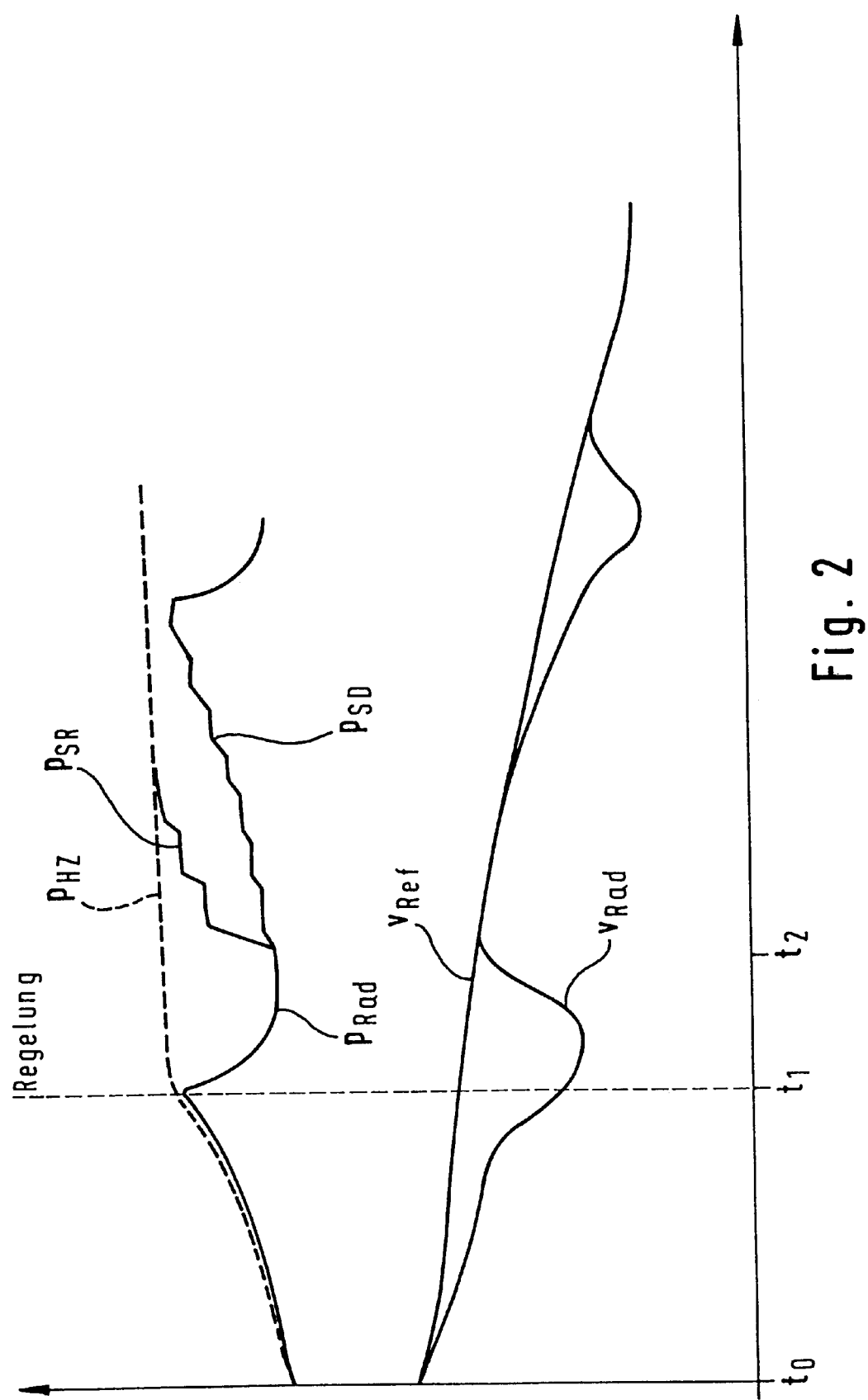
FIG. 2 shows in a flow chart the variation of some control quantities (wheel pressure, initial pressure, vehicle reference speed, and wheel speed) during a braking operation in which the method of the present invention is used.

The embodiment of FIG. 2 serves to describe the operation and mode of effect of the method of the present invention. To explain the actions in the course of the method of this invention, FIG. 2 shows the pressure variation in the master cylinder $p_{HZ}$ (dotted lines), the pressure variation $p_{Rad}$ in the wheel brake of the wheel observed in the normal case or a standard braking pressure control operation, the braking pressure variation $p_{SR}$ in this wheel when the special control of the present invention is employed, and further the speed variation $v_{Rad}$ of the wheel which became unstable at the time observed, and finally the variation of the vehicle speed or vehicle reference speed $v_{Ref}$. The same time scale t applies in all curves or procedures. The braking operation observed herein commences at the time $t_0$, and instability starts at $t_1$.

A critical braking situation in which the present invention is implemented prevails when in a braking operation with a relatively low initial pressure $p_{HZ}$ a wheel becomes unstable and anti-lock control sets in. $t_1$ marks the commencement of the control. The braking pressure $p_{Rad}$ is reduced so that the wheel recovers, becomes stable again ($t_2$), and braking pressure can be built up again. As a result of the relatively low initial pressure $p_{HZ}$, the braking pressure following $t_2$ will rise only relatively slowly in such a case and approach the wheel lock pressure or initial pressure at a relatively slow rate. The pressure variation in a standard control operation is referred to as $p_{SD}$ in FIG. 1. Of course, stopping distance is "wasted" due to this slow braking pressure build-up.

In order to completely use the existing coefficient of friction, a much steeper pressure rise compared to the pressure variation $p_{SD}$ and a much quicker approach to the wheel lock pressure level or to the initial pressure $p_{HZ}$ is desired. When the method of the present invention is employed, that is the special control of the present invention, the braking pressure variation referred to by $p_{SR}$ and, thus, a considerable increase of the braking effect is achieved. According to the present invention, this is achieved by "uncoupling" the braking pressure in branch 18 of the braking pressure control system, i.e., the pressure at the inlet of the inlet valves 5, 7, at the commencement of an anti-lock control operation, i.e., when the control commences at time $t_1$ (FIG. 1). The pressure fluid which is conducted by way of the outlet valves 6, 8 into the low-pressure accumulator 9 in the phase of pressure reduction following $t_1$ is supplied from the low-pressure accumulator 9 by way of the pump 10 into the branch 18 in order to develop a high system pressure in branch 18 and, thus, to quickly increase the braking pressure in wheel brakes 3, 4. This uncoupling action is carried out by switch-over of the separating valve 11 into the closed condition. When the initial pressure in the master cylinder 1 increases, pressure fluid is not impeded to propagate into branch 18 by way of the non-return valve 12.

The special valve 14 is closed at the commencement of the control so that the low-pressure accumulator 9 is initially emptied. As soon as the amount of volume removed or the degree of filling of the accumulator 9 falls below a limit value, the special valve 14 is switched to open passage so that now pressure fluid can propagate from the master cylinder 1 to the suction side of the pump 10. Change-over of the special valve 14 into the open condition can be controlled in dependence on different criteria, such as, the still existing residual quantity in the low-pressure accumulator 9, in dependence on opening of the inlet valve 5, 7, etc.

Summarizing, the operation and mode of effect of the circuit of FIG. 1 which is equipped with pressure sensors 15 on the master cylinder 1 can be described as follows.

When commencement into ABS control is detected at one or more wheels, the separating valves or TCS-valves 11 are closed. Further pressure increase initiated by the driver is possible any time by way of the parallel connected non-return valves 12. Initially, the special valves 14 remain closed. The pressure fluid volume discharged during pressure reduction following the detection of instability is aspirated by the pump 10 via the low-pressure accumulators 9 and serves for the system pressure increase upstream of the inlet valves 5, 7. In the absence of a pressure reduction phase in the corresponding brake circuit, or if no further pressure reduction is expected, the fluid volume supply of the pump 10 is ensured by opening of the separating valves 14 so that now the pump 10 is delivered with fluid directly from the master cylinder 1, with the result that system pressure development (in branch 18) is permitted. Knowing about the degree of filling of the low-pressure accumulators 9 permits a delay in opening the special valves 14 until the complete evacuation or critical evacuation of the low-pressure accumulators 9. It is also possible to open the special valves 14 synchronously to the inlet valves 5, 7.

The degree of filling in the low-pressure accumulators 9 can be measured by a corresponding sensor. However, for cost reasons, it is preferred to determine the degree of filling by a volume model or low-pressure accumulator model, reproduced by software, which is derived e.g. from valve actuation operations in a per se known manner.

The system pressure in the brake circuit is limited by a pressure-relief valve 13.

Detection of the driver's intent is carried out by means of pressure sensor 15 in the present embodiment. The pressure measured in the master cylinder 1 is associated with a pressure/deceleration characteristic curve of the vehicle that is stored in the software in the controller (not shown). This value is compared with the deceleration computed from the wheel sensor signals. In case the actual vehicle deceleration is considerably in excess of the deceleration which corresponds to the initial pressure, i.e., the pressure in the master cylinder 1, this indicates that the driver wishes a reduced deceleration. In this case, the special control of the present invention is terminated, and switch-over to a standard braking pressure control is made in order to prevent excessive braking which goes beyond the brake command issued by pedal application.

It is principally also possible to employ the method of the present invention in a brake system which is equipped with a so-called brake assist function. In this case, the system pressure increase is caused by actuation of the brake assist system when commencement of ABS control is detected at one or more of the wheels.

When the driver wishes to reduce the deceleration, the release switch implemented in the brake assist system will be actuated and the special control according to the present invention thereby terminated. Again, the standard braking pressure control will set in.

Forced braking on a road surface with abrupt changes in the coefficient of friction is expediently prevented by a long-time monitoring of the wheel rotational behavior (all wheels stable).

The method of the present invention proves extremely favorable. Because an "optimal initial pressure" is always available to the system, long pressure increase series are avoided which would cause a non-homogeneous deceleration and losses in braking effect.

With the method of the present invention, the "normal driver" is permitted an optimal utilization of the coefficient of friction even if there are certain operating errors, in particular, a too weak brake pedal application.

Controlled braking operations at low initial pressures frequently cause stability problems in braking operations during cornering when the standard control algorithms are applied. These difficulties, too, are lessened or even eliminated by the method of the present invention.

Increasing the braking pressure is possible to the driver in every situation by increase of the initial pressure, which offers a high degree of safety and prevents braking at too low forces.

What is claimed is:

1. Method of controlling an anti-lock system (ABS) of a vehicle, the system including a master cylinder, inlet and outlet valves, a separating valve and a special valve interposed between the master cylinder and the inlet valves, a low-pressure accumulator, and a hydraulic pump, the method comprising the steps of:
   switching from a standard braking pressure control mode to a special braking pressure control mode, upon commencement of the ABS, by
      uncoupling from the master cylinder that branch of the control system to which a wheel detected as unstable is connected by closing the separating and special valves in that branch of the control system to cause fluid to propagate from the low-pressure accumulator into that branch of the control system to which the wheel detected as unstable is connected, and
      opening the special valve when a level in the low-pressure accumulator falls below a predetermined level such that fluid propagates from the master cylinder to the suction side of the hydraulic pump, thereby rapidly increasing a pressure of the fluid in that branch of the control system to which the wheel detected is unstable.

2. Method according to claim 1, whereby an actuation of an inlet valve in that branch of the control system to which the wheel detected as unstable is connected occurs when the special valve is opened.

3. Method according to claim 1, further including the step of determining a fluid pressure in the master cylinder by means of a characteristic curve stored in a controller.

4. Method according to claim 3, further including the step of comparing the characteristic curve to a deceleration of the vehicle.

5. Method according to claim 4, further including the step of switching to a standard braking pressure control without uncoupling that branch of the control system to which a wheel detected as unstable is connected when the deceleration of the vehicle exceeds a value corresponding to the fluid pressure in the master cylinder.

* * * * *